US010188578B2

(12) United States Patent
Hefron et al.

(10) Patent No.: US 10,188,578 B2
(45) Date of Patent: Jan. 29, 2019

(54) POWERED HANDLE BAR APPARATUS FOR STAIRCASE, RAMP OR LEVEL WALK AREA WALKING ASSISTANCE FOR CHALLENGED INDIVIDUALS

(71) Applicants: Mark William Hefron, The Villages, FL (US); Cynthia Reed, Shueyville, IA (US); James C Reed, Urbandale, IA (US)

(72) Inventors: Mark William Hefron, The Villages, FL (US); Cynthia Reed, Shueyville, IA (US); James C Reed, Urbandale, IA (US)

( * ) Notice: Subject to any disclaimer, the term of this patent is extended or adjusted under 35 U.S.C. 154(b) by 0 days.

(21) Appl. No.: 15/685,160

(22) Filed: Aug. 24, 2017

(65) Prior Publication Data

US 2018/0055714 A1 Mar. 1, 2018

Related U.S. Application Data

(60) Provisional application No. 62/379,087, filed on Aug. 24, 2016.

(51) Int. Cl.
*B65G 17/00* (2006.01)
*A61H 3/00* (2006.01)
*B66B 31/00* (2006.01)

(52) U.S. Cl.
CPC ....... *A61H 3/00* (2013.01); *A61H 2201/1207* (2013.01); *A61H 2201/5028* (2013.01); *A61H 2201/5041* (2013.01); *A61H 2201/5066* (2013.01); *B66B 31/00* (2013.01)

(58) Field of Classification Search
CPC ................................ A61H 3/008; B61B 3/00
USPC ........................................................ 198/335
See application file for complete search history.

(56) References Cited

U.S. PATENT DOCUMENTS 7,395,764 B2 * 7/2008 Debrunner .......... E04F 11/1863 104/89
2007/0246435 A1 * 10/2007 Crookston ............. B65G 21/14 212/264
2014/0206503 A1 * 7/2014 Stockmaster .......... A61H 3/008 482/4

* cited by examiner

*Primary Examiner* — Gene O Crawford
*Assistant Examiner* — Lester Rushin, III

(57) ABSTRACT

An indoor, electrically powered, and motorized handlebar structure that provides forward moving or stationary stability for mobility-challenged individuals includes a trolley support bar, a handle, a handle operating system, a control box, a drive assembly, an access control reader, at least one accessory, and a power source. The trolley support bar is mounted on to a solid surface area that can be a wall surface or a floor surface as the handle is operatively coupled to the trolley support bar by the drive assembly. The control box is terminally connected to the trolley support bar and house the access control reader, the at least one accessory, and the power source. The drive assembly, the access control reader, and the at least one accessory are electrically connected to the power source through the handle operating system so that handle can move between a forward direction and a backward direction.

15 Claims, 14 Drawing Sheets

POWERED HANDLE BAR APPARATUS FOR STAIRCASE, RAMP OR LEVEL WALK AREA WALKING ASSISTANCE FOR CHALLENGED INDIVIDUALS

The current application claims a priority to the U.S. Provisional Patent application Ser. No. 62/379,087 filed on Aug. 24, 2016.

FIELD OF THE INVENTION

The present invention relates generally to a mobility assistance apparatus. More specifically, the present invention is an indoor, electrically powered, motorized handlebar structure that provides forward moving or stationary stability for mobility-challenged individuals. Furthermore, the present invention can be installed to provide such assistance in staircase, ramp or level walkway environments.

BACKGROUND OF THE INVENTION

A mobility aid is a device designed to assist walking or otherwise improve the mobility of people with a mobility impairment. There are various walking aids that can help people with impaired ability to walk and wheelchairs or mobility scooters for more severe disability or longer journeys which would otherwise be undertaken on foot. In other words, walking aids such as cane, crutches, and walkers can help individuals with impaired ability to walk to complete day-to-day tasks. Manually propel or electrically powered wheelchairs and mobility scooters help individuals with disability complete adventures tasks or longer journeys. Additionally, a stairlift can be categorized as a mobility aid as the stairlift lifts people and wheelchairs up and down the stairs. However, some individuals prefer to utilize walking devices instead of the cumbersome wheelchairs and mobility scooters for household activates but lack the necessary strength to utilize those walking devices.

It is therefore and objective of the present invention provides an indoor, electrically powered, motorized, mobility assistance handlebar structure that is positioned in front of the user to provides forward moving or stationary stability for mobility-challenged individuals. When installed, the present invention provides assistance and stability in staircase, ramp or level walkway environments. As a result, the present invention is able to combine the functionality and efficiency of the wheelchairs and mobility scooters into the compact design of the cane, crutches, and the walkers.

DETAIL DESCRIPTIONS OF THE INVENTION

Figure 1:
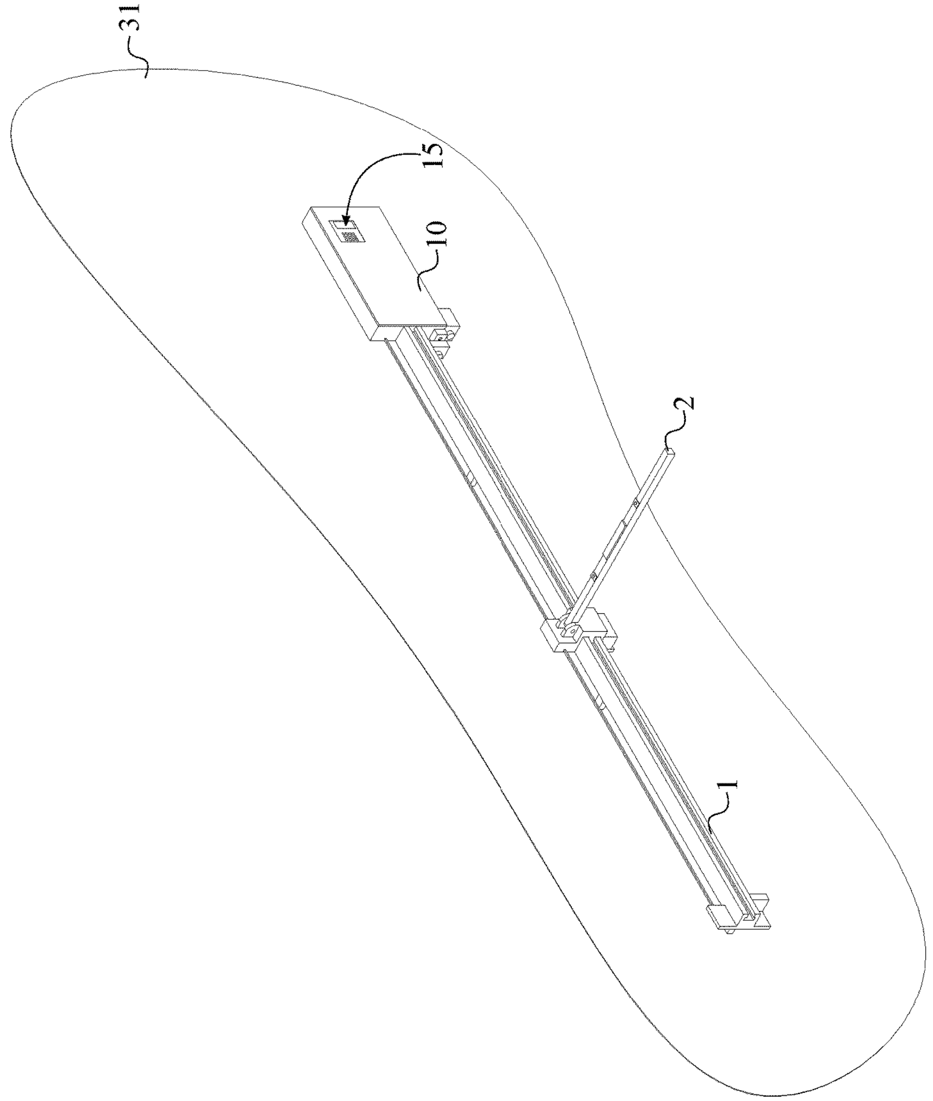
FIG. 1 is a perspective view for the service position of the present invention.

All illustrations of the drawings are for the purpose of describing selected versions of the present invention and are not intended to limit the scope of the present invention.

The present invention is a powered handle 2 bar apparatus for walking assistance so that the individuals with impaired ability to walk or disabilities can be assisted. The present invention combines the functionality and the efficiency of the motorized wheelchairs and scooters, and the compact profile and functionality of cane, crutches, and walkers into a single apparatus. The present invention comprises a trolley support bar 1, a handle 2, a handle operating system 3, a control box 10, a drive assembly 11, an access control reader 15, at least one accessory 18, and a power source 24 as shown in FIG. 1 and FIG. 10-13. In reference to general configuration of the present invention, the trolley support bar 1 is mounted on to a solid surface area 31 that can be a wall surface of a building structure. The handle 2 is operatively coupled to the trolley support bar 1 by the drive assembly 11. The control box 10 is terminally connected to the trolley support bar 1 as the access control reader 15, the at least one accessory 18, and the power source 24 are integrated into the control box 10. In reference to FIG. 14, the drive assembly 11, the access control reader 15, and the at least one accessory 18 are electrically connected to the power source 24 through the handle operating system 3. When the present invention is activated through the access control reader 15, the handle 2 moves from a retracted position to a service position so that the user of the present invention is capable of operating the handle 2 in a forward direction and then in a backward direction.

Figure 3:
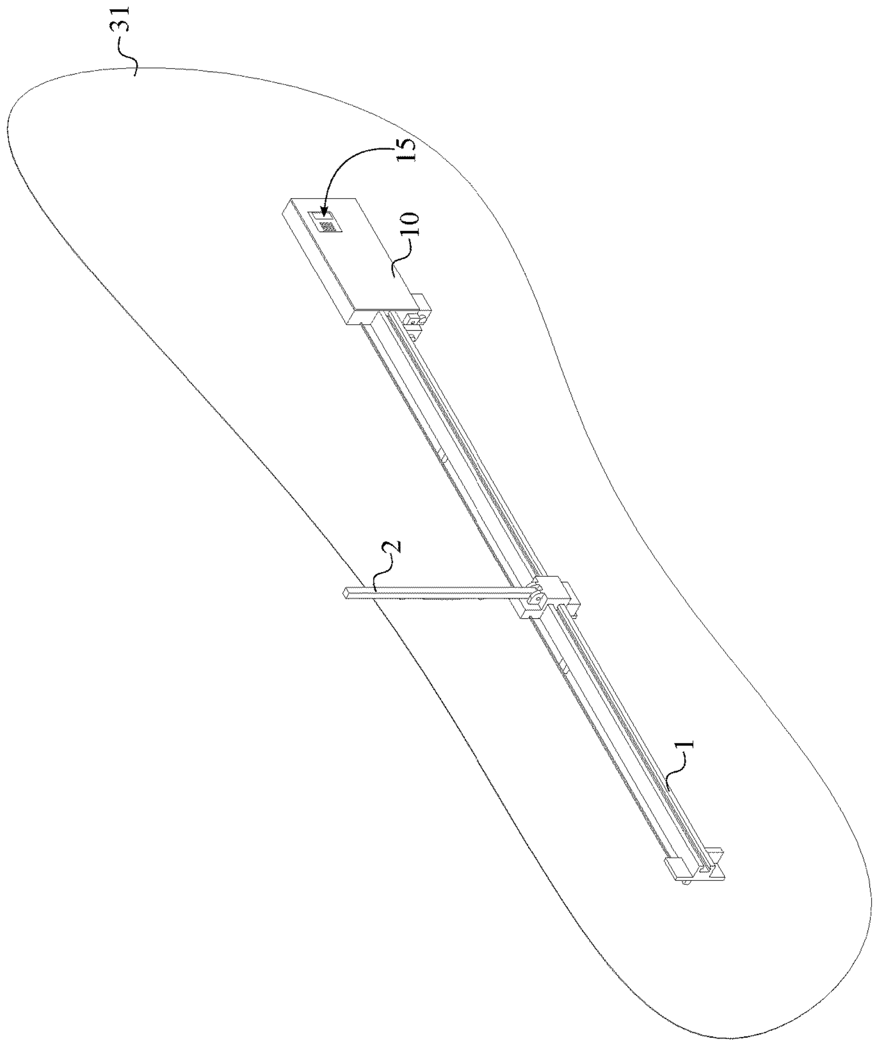
FIG. 3 is a perspective view for the retracted position of the present invention.

In reference to FIG. 1 and FIG. 3, the trolley support bar 1 that supports the control box 10 is mounted to the solid surface area 31 during installation of the present invention. In order to properly support the present invention and the weight of the user, the solid surface area 31 can be strengthened appropriately. The length or the travel distance of the handle 2 is adjustable within the present invention to accommodate different surface areas.

Figure 2:
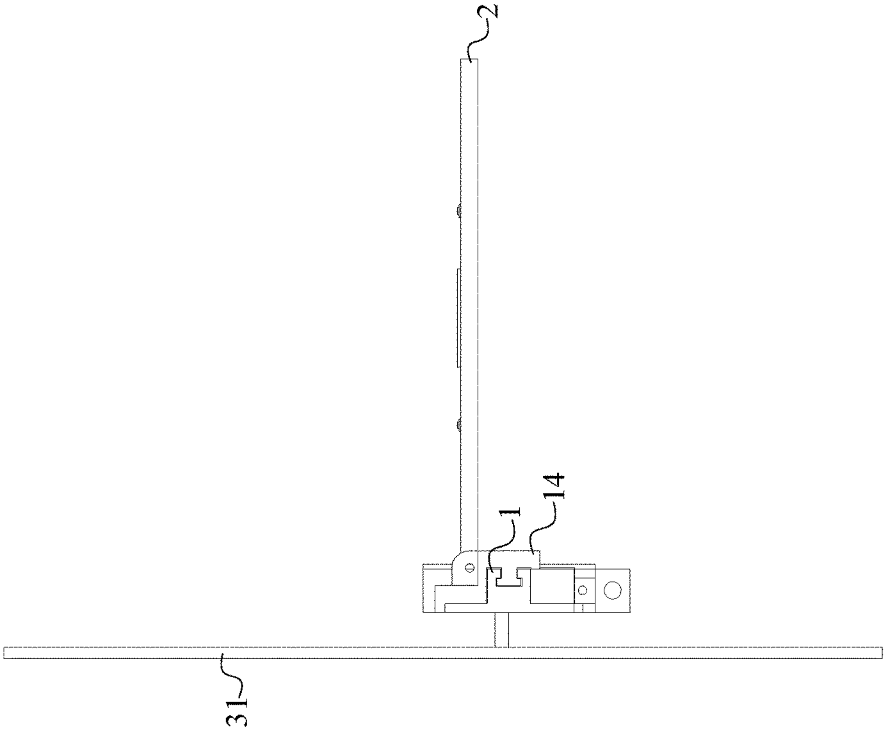
FIG. 2 is a side view for the service position of the present invention, wherein the handle is perpendicularly positioned to the solid surface area.
Figure 4:
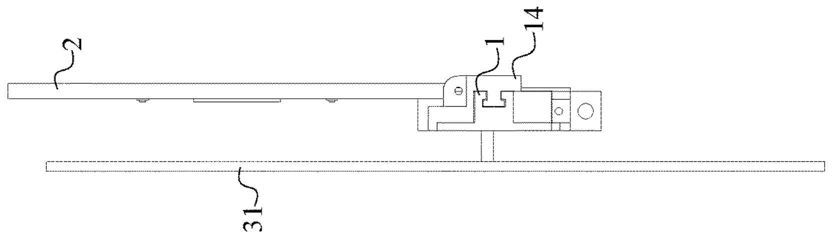
FIG. 4 is a side view for the retracted position of the present invention, wherein the handle is positioned parallel to the solid surface area.
Figure 5:
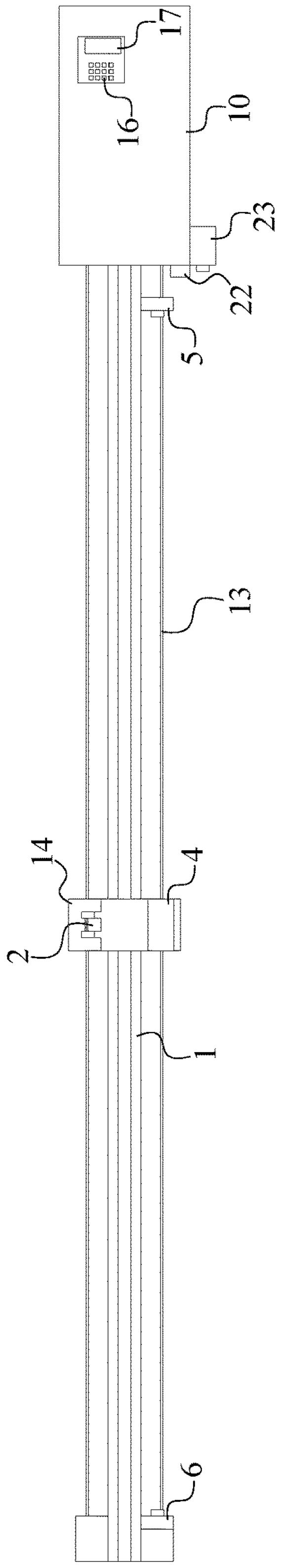
FIG. 5 is a front view of the present invention without the solid surface area.

In reference to FIG. 2 and FIG. 4, the handle 2 is an elongated rod and provides sufficient surface area so that the user is able to comfortably grasp the handle 2. The handle 2 is designed to support the weight of the user, preferably 250-350 pounds, so that the handle 2 enables an individual to potentially pull themselves into a standing position and complete their cycle if the individual has fallen or simply lost strength in their legs.

Figure 8:
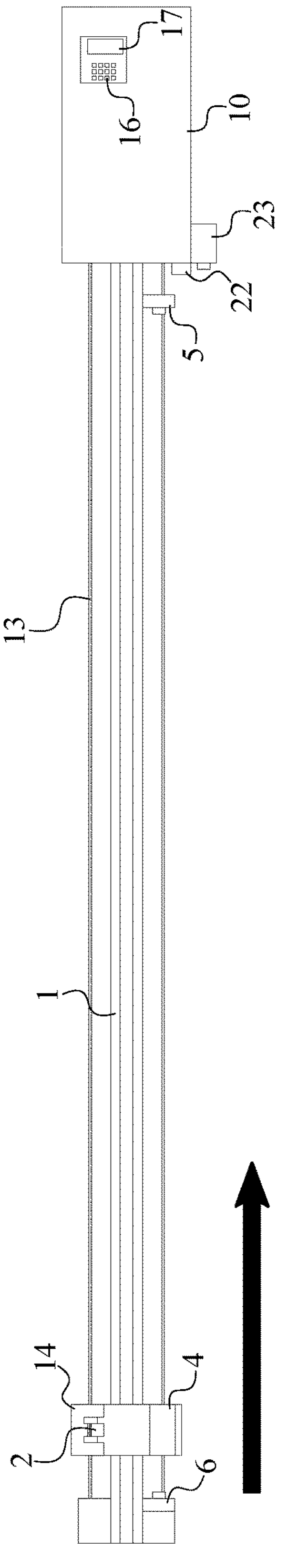
FIG. 8 is an illustration showing the backward direction of the present invention after the engagement of the second limit switch and the travel direction activator.
Figure 9:
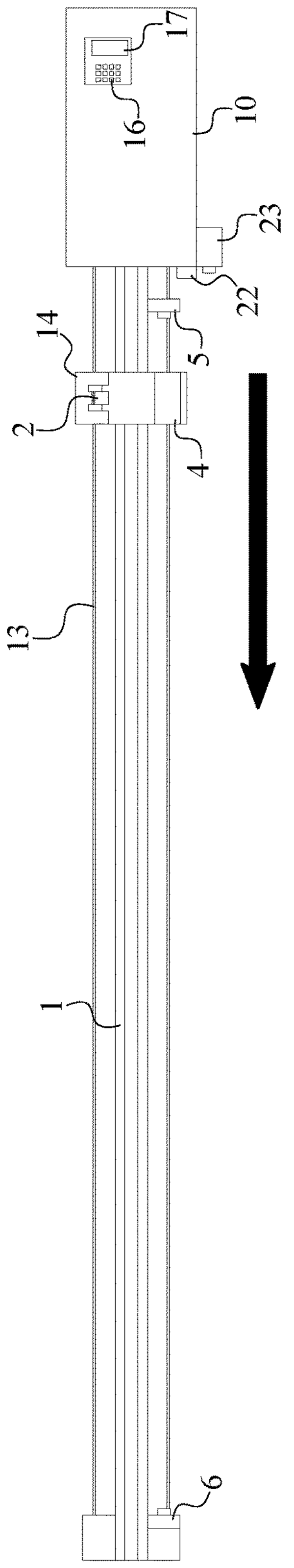
FIG. 9 is an illustration showing the forward direction of the present invention after the engagement of the first limit switch and the travel direction activator.
Figure 10:
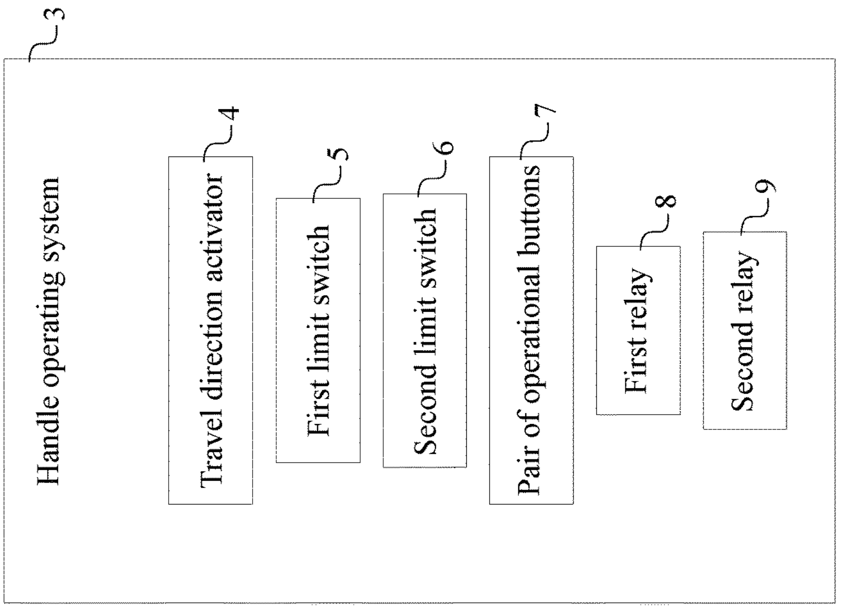
FIG. 10 is a schematic diagram showing the components of the handle operating system of the present invention.
Figure 11:
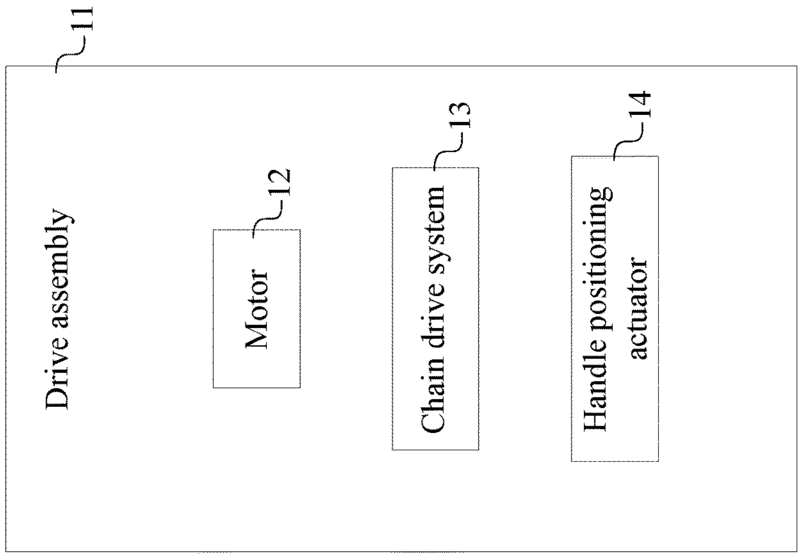
FIG. 11 is a schematic diagram showing the components of the drive assembly of the present invention.
Figure 12:
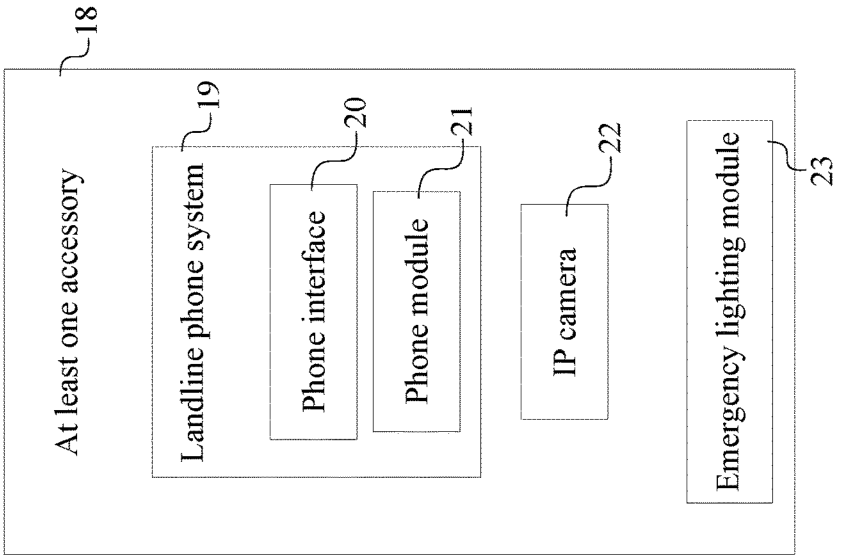
FIG. 12 is a schematic diagram showing the components of the at least one accessory of the present invention.

The handle operating system 3 allows the user to operate the present invention in the forward direction and the backward direction. In reference to FIG. 5-7 and FIG. 10, the handle operating system 3 comprises a travel direction activator 4, a first limit switch 5, a second limit switch 6, a pair of operational buttons 7, a first relay 8, and a second relay 9. The first limit switch 5 is terminally connected to the trolley support bar 1. The second limit switch 6 is terminally connected to the trolley support bar 1, opposite of the first limit switch 5. The first limit switch 5 and the second limit switch 6 are concentrically positioned of each other along the trolley support bar 1. The travel direction activator 4 is connected a handle positioning actuator 14 of the drive assembly 11. The travel direction activator 4 is concentrically positioned in between the first limit switch 5 and the second limit switch 6. The first limit switch 5 and the second limit switch 6 function similar to conventional limit switches so that the forward direction and the backward direction of the present invention can be determined with reference to the positioning of the travel direction activator 4. More specifically, the engagement between the first limit switch 5 and the travel direction activator 4 enables the movement of the handle 2 in the forward direction as shown in FIG. 9. Oppositely, the engagement between the second limit switch 6 and the travel direction activator 4 enables the movement of the handle 2 in the backward direction as shown in FIG. 8. The actual movement of the handle 2 in the forward direction or the backward direction is accomplished through the pair of operational buttons 7 that is connected to the handle 2. In order to move the handle 2 in the forward direction or the backward direction, the travel direction activator 4, the first limit switch 5, the second limit switch 6, the pair of operational buttons 7, the first relay 8, and the second relay 9 are electrically connected to each other as the first relay 8 and the second relay 9 are mounted within the control box 10.

The present invention preferably utilizes a soft touch buttons that required minimum strength to activate as the pair of operational buttons 7. Additionally, the pair of operational buttons 7 is required to be simultaneously pressed to assure both hands of the user are positioned on the handle 2 while in motion. The first relay 8 and the second relay 9 function as programmable logic controllers within the present invention so that sequential control/operating steps such as the retracted position of the handle 2, the service position of the handle 2, the forward direction of the handle 2, the backward direction of the handle 2, the sequential pressing for the pair of operational buttons 7, the rotational direction of the drive assembly 11, and the operation of the at least one accessory 18 can be executed within the present invention. The first relay 8 and the second relay 9 also prevent the handle 2 from traveling in opposite direction if the handle 2 is stopped mid-cycle. For example, if the handle 2 is stopped mid-cycle during the forward direction movement, the handle 2 must first complete the forward direction movement in order enable the reversal of the direction, which is the backward direction. This is a safety feature within the present invention to prevent unnecessary dragging of an individual in the opposite direction from the initial direction. Optionally, the pair of operational buttons 7 can be electrically connected to a motor speed control system so that the user is able to control the forward direction speed and the backward direction speed.

The drive assembly 11 moves the handle 2 in the forward direction or the backward direction and the retracted position or the service position, depending upon the user inputs. In reference to FIG. 11, the drive assembly 11 comprises a motor 12, a chain drive system 13, and the handle positioning actuator 14. The motor 12 is mounted within the control box 10 as the handle 2 is slidably mounted to the trolley support bar 1 by the handle positioning actuator 14. In reference to FIG. 14, the handle positioning actuator 14 and the motor 12 are electrically connected to the power source 24 through the handle operating system 3 so that the handle 2 can move from the retracted position to the service position or the service position to the retracted position. More specifically, when the present invention is activated through the access control reader 15, the handle 2 automatically moves from the retracted position to the service position so that the user can engaged with the present invention. When the present invention is deactivated through the access control reader 15 or an automatic shut-off sensor, the handle 2 automatically moves from the service position to the retracted position. Furthermore, when the handle 2 is positioned parallel to the solid surface area 31 and positioned along the solid surface area 31, the handle 2 is delineated to be in the retracted position within the present invention. When the handle 2 is positioned perpendicular to the solid surface area 31 and projected from the solid surface area 31, the handle 2 is delineated to be in the service position within the present invention.

The chain drive system 13 is connected to the trolley support bar 1 and the handle 2 so that the motor 12 and the handle 2 can be engaged by the chain drive system 13. In reference to the preferred embodiment of the present invention, the handle 2 is driven along the trolley support bar 1 via the chain drive system 13 from a sprocket and shaft through a worm gear driven spur gear. The worm gear has a safety drive pin made of soft metal as the safety drive pin engages with the worm gear and a drive shaft that is axially connected to the motor 12. The safety drive pin would shear if there is excessive force applies upon the chain drive system 13. There is however sufficient friction within the chain drive system 13 to preclude a free fall of the handle 2 in the event the safety drive pin is sheared.

The access control reader 15, which is externally connected to the control box 10, provides security protection against unauthorized use of children or other untrained individuals. In reference to FIG. 5, the access control reader 15 can be an activation keypad 16 or a Radio-frequency identification (RFID) reader 17 that is activated with a RFID key fob. When the access control reader 15 is the activation keypad 16, the user can input the correct access cord in order to activate the present invention. When the access control reader 15 is the RFID reader 17, the user can place the RFID key fob near the RFID reader 17 to activate the present invention. Once the present invention is activated, the handle 2 transitions from the retracted position to the service position thus rotating about 90 degrees.

The at least one accessory 18 comprises a landline phone system 19. In reference to FIG. 6 and FIG. 12, the landline phone system 19 comprises a phone interface 20 and a phone module 21. The phone interface 20 is adjacently connected to the handle 2 so that the user can easily access the landline phone system 19 if the user experiences any difficulty during transitioning of the forward direction or the backward direction. The phone module 21 is mounted within the control box 10 and is communicably coupled to the phone interface 20. Even though the present invention utilizes the landline phone service, which operates during a local utility power outage, as the preferred method of communication, the present invention is not limited to landline phone service and can use mobile phone service as an alternative service. Optionally, the phone interface 20 can be pre-programmed to dial stored contact numbers in an emergency. For example, the user can utilize the phone interface 20 to call the pre-programmed telephone numbers with a call button of the phone interface 20. When one of the pre-programmed number is answered, a normal speaker-phone call can take place about the handle 2.

The at least one accessory 18 further comprises an internet protocol (IP) camera 22. In reference to FIG. 5 and FIG. 12, the IP camera 22 is externally mounted to the control box 10 and oriented towards the handle 2 so that the IP camera 22 is able to record or stream the activities of the user. The activation of the IP camera 22 can be granted by the user and/or a responsible caretaker if the user is required to be under surveillance. As a result, the user can be monitored via smart phone or monitoring station during the transition progress of the user.

The at least one accessory 18 further comprises and an emergency lighting module 23. In reference to FIG. 5 and FIG. 12, the emergency lighting module 23 is externally mounted to the control box 10 and is oriented towards the handle 2. More specifically, the present invention is generally powered through a primary power supply 25 of the power source 24. The emergency lighting module 23 is intended to automatically activate during a failure of the primary power supply 25 as the emergency lighting module 23 is powered through a secondary power supply 28 of the power source 24. Resultantly, the emergency lighting module 23 is able to illuminate the service area of the handle 2 through the secondary power supply 28.

Figure 6:
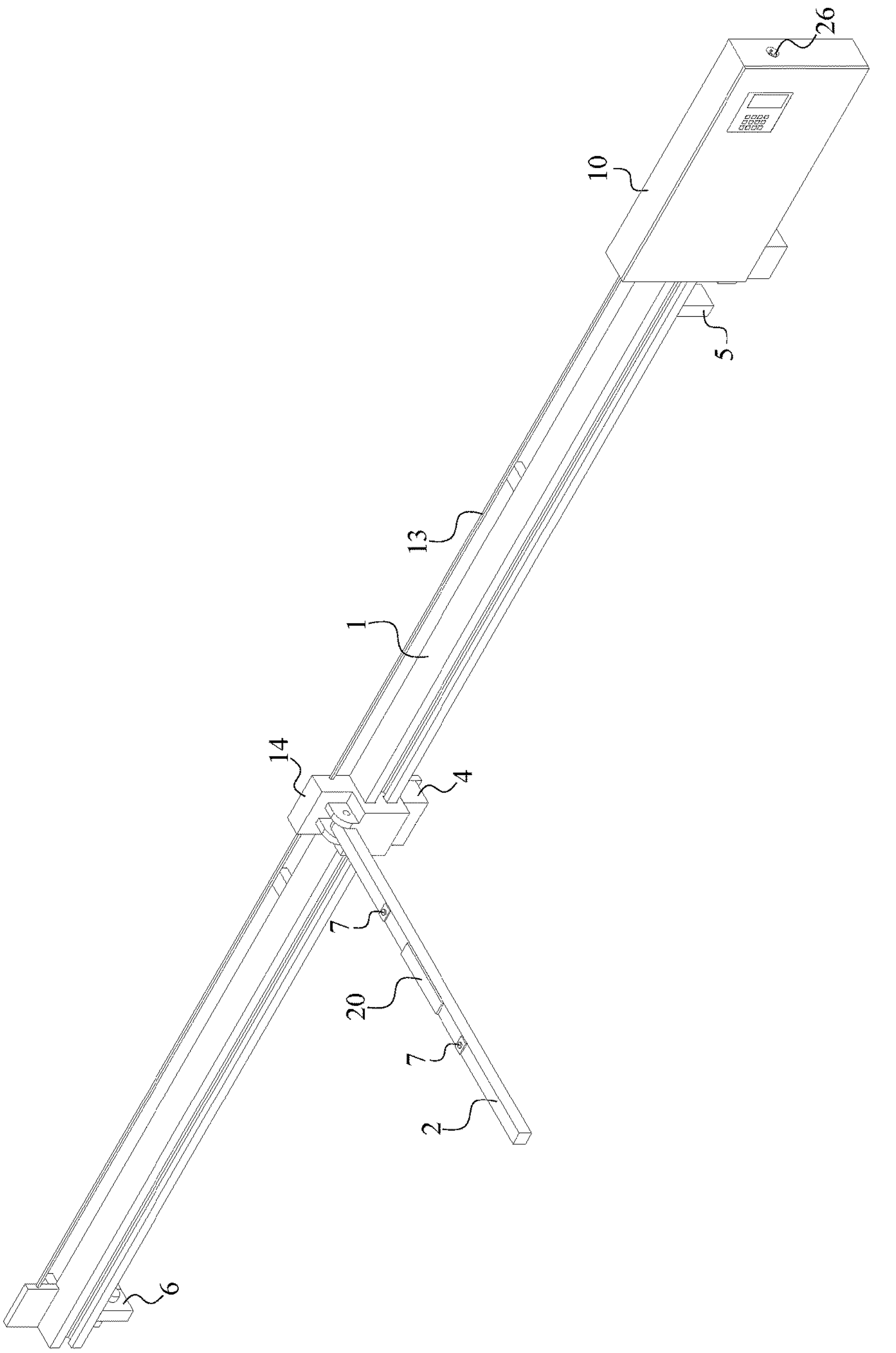
FIG. 6 is a back-perspective view of the present invention without the solid surface area.
Figure 13:
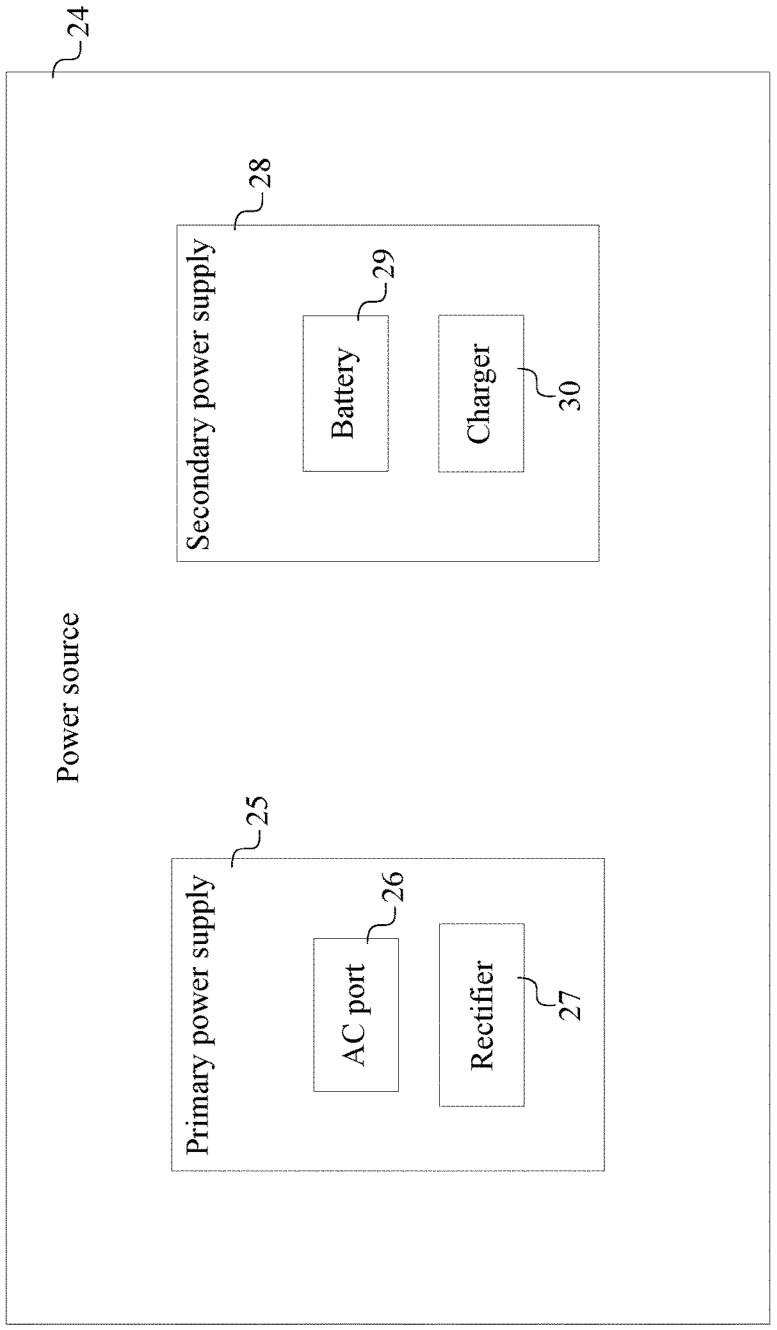
FIG. 13 is a schematic diagram showing the components of the power source of the present invention.
Figure 14:
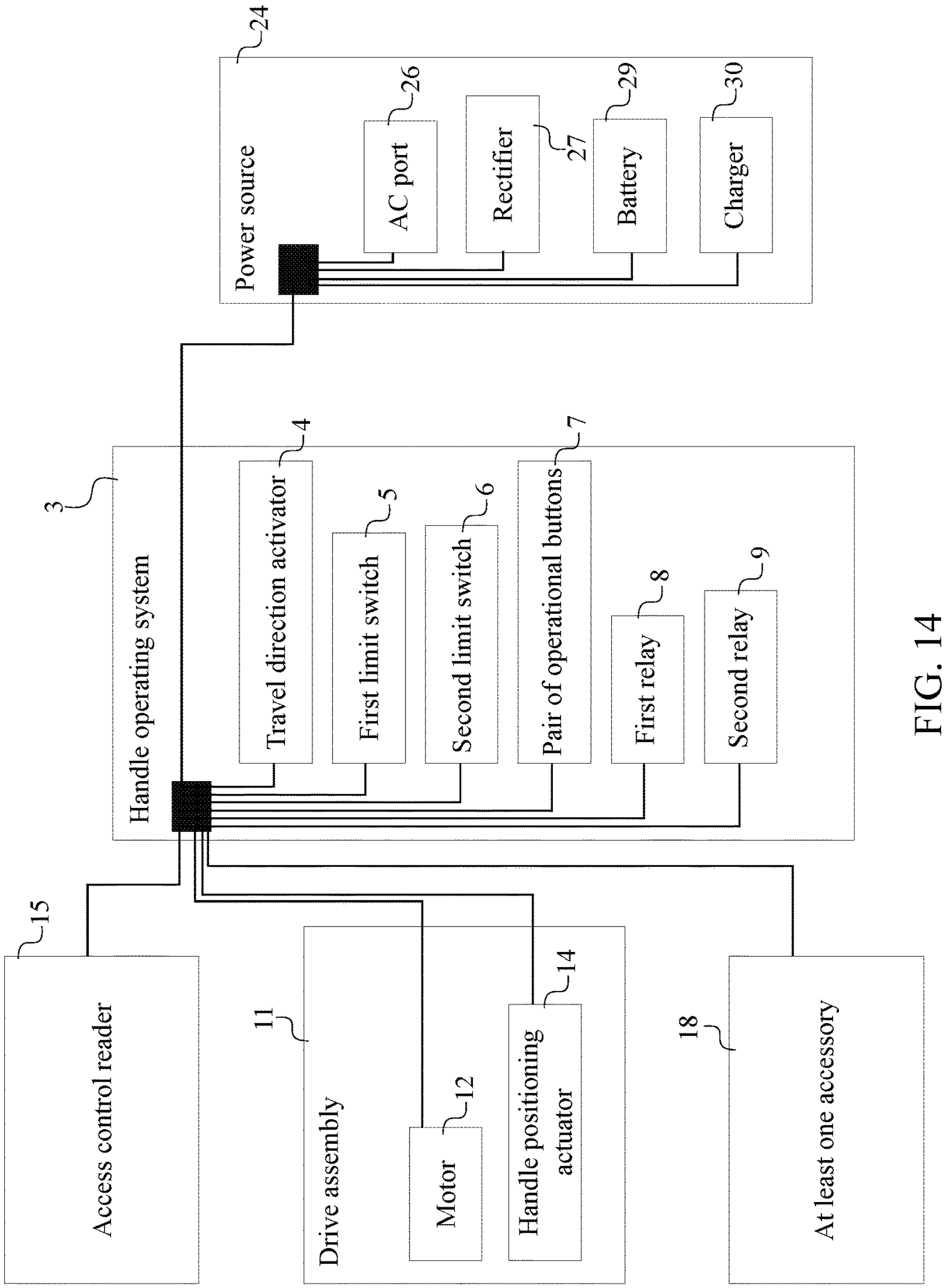
FIG. 14 is a schematic diagram showing electrical connections of the present invention.

In reference to FIG. 6 and FIG. 13-14, the primary power supply 25 comprises an alternating current (AC) port 26 and a rectifier 27. The AC port 26 is mounted to the control box 10 so that the AC port 26 is able to electrically connect with an external power outlet. The rectifier 27, which converts the AC current to direct current (DC) is mounted within the control box 10. The AC port 26 is electrically connected to the rectifier 27 so that the present invention can be powered through the primary power supply 25.

Figure 7:
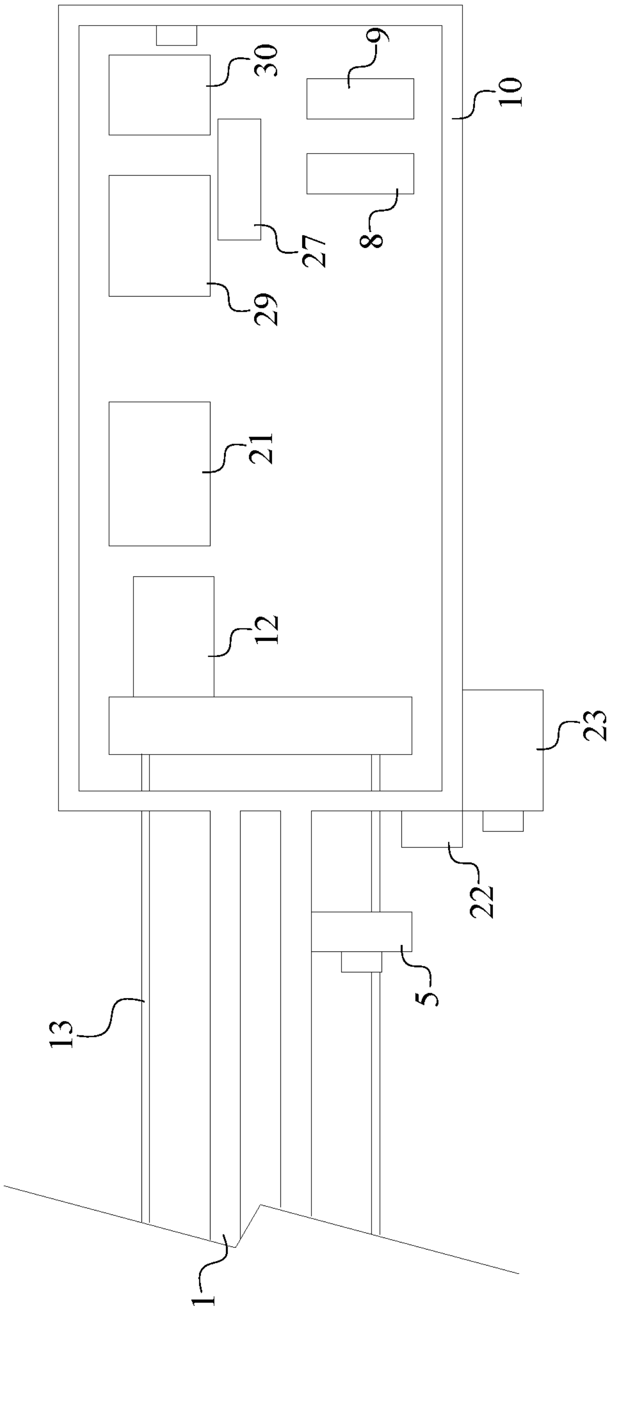
FIG. 7 is a schematic view showing the internal and external components that are mounted the control box.

In reference to the FIG. 7 and FIG. 13-14, the secondary power supply 28 comprises a battery 29 and a charger 30. The battery 29 and the charger 30 are mounted within the control box 10 as the battery 29 is electrically connected to the charger 30. More specifically, the present invention utilizes the primary power supply 25 to charge the battery 29 through the charger 30 so that the secondary power supply 28 can functions as a backup power unit within the present invention.

Optionally, the present invention can comprise a self-diagnostic system that whereby continuous system health is monitored for the user confidence and to aid in the unlikely event that a mechanical or an electrical fault would preclude normal use. For example, two colored light-emitting diode (LED) indicators on the control box 10 would indicate the following assumptions:

Green LED—the present invention is safe to use

Red LED—call for service as a fault may exist

Optionally, the present invention can comprise a fall prevention seat. The fall prevention seat would provide a small padded seat that moves into position upon the present invention's activation so that the user can be provided with a vertical support assistance until the user stops motion mid-cycle (by releasing the pair of operational buttons 7). The fall prevention seat would then rotate down so that the user would be kept from falling onto the service area. When the user regains an upright stance, the seat returns to the vertical support assistance for continuation of the cycle direction of travel.

Although the invention has been explained in relation to its preferred embodiment, it is to be understood that many other possible modifications and variations can be made without departing from the spirit and scope of the invention as hereinafter claimed.

What is claimed is:

1. A powered handle bar apparatus for walking assistance comprises:

a trolley support bar;

a handle;

a handle operating system;

a control box;

a drive assembly;

an access control reader;

at least one accessory;

a power source;

the trolley support bar being mounted on to a solid surface area;

the control box being terminally connected to the trolley support bar;

the handle being operatively coupled to the trolley support bar by the drive assembly;

the access control reader, the at least one accessory, and the power source being integrated into the control box;

the drive assembly, the access control reader, and the at least one accessory being electrically connected to the power source through the handle operating system;

the at least one accessory comprises a landline phone system;

the landline phone system comprises a phone interface and a phone module;

the phone interface being adjacently connected to the handle;

the phone module being mounted within the control box; and the phone interface being communicably coupled to the phone module.

2. The powered handle bar apparatus for walking assistance as claimed in claim 1, wherein the solid surface being a wall surface.

3. The powered handle bar apparatus for walking assistance as claimed in claim 1 comprises:

the handle operating system comprises a travel direction activator, a first limit switch, a second limit switch, a pair of operational buttons, a first relay, and a second relay;

the first limit switch being terminally connected to the trolley support bar;

the second limit switch being terminally connected to the trolley support bar, opposite of the first limit switch;

the first limit switch and the second limit switch being concentrically positioned of each other along the trolley support bar;

the travel direction activator being connected a handle positioning actuator of the drive assembly;

the travel direction activator being concentrically positioned in between the first limit switch and the second limit switch, wherein the handle moves between a forward direction and a backward direction;

the pair of operational buttons being connected to the handle;

the first relay and the second relay being mounted within the control box; and the travel direction activator, the first limit switch, the second limit switch, the pair of operational buttons, the first relay, and the second relay being electrically connected to each other.

4. The powered handle bar apparatus for walking assistance as claimed in claim 3, wherein an engagement between the first limit switch and the travel direction activator enables the movement of the handle in the forward direction.

5. The powered handle bar apparatus for walking assistance as claimed in claim 3, wherein an engagement between the second limit switch and the travel direction activator enables the movement of the handle in the backward direction.

6. The powered handle bar apparatus for walking assistance as claimed in claim 1 comprises:

the drive assembly comprises a motor, a chain drive system, and a handle positioning actuator;

the motor being mounted within the control box;

the handle being slidably mounted to the trolley support bar by the handle positioning actuator, wherein the handle moves between a service position and a retracted position;

the chain drive system being connected to the trolley support bar and the handle;

the motor and the handle being engaged to each other by the chain drive system;

the handle positioning actuator being electrically connected to the power source by the handle operating system; and the motor being electrically connected to the power source by the handle operating system.

7. The powered handle bar apparatus for walking assistance as claimed in claim 6, wherein the handle being positioned parallel to the solid surface area delineating the retracted position.

8. The powered handle bar apparatus for walking assistance as claimed in claim 6, wherein the handle being positioned perpendicular to the solid surface area delineating the service position.

9. The powered handle bar apparatus for walking assistance as claimed in claim 1, wherein the access control reader is an activation keypad.

10. The powered handle bar apparatus for walking assistance as claimed in claim 1, wherein the access control reader is a radio-frequency identification (RFID) reader.

11. The powered handle bar apparatus for walking assistance as claimed in claim 1 comprises:

the at least one accessory comprises an internet protocol (IP) camera;

the IP camera being externally mounted to the control box; and the IP camera being oriented towards the handle.

12. The powered handle bar apparatus for walking assistance as claimed in claim 1 comprises:

the at least one accessory comprises an emergency lighting module;

the emergency lighting module being externally mounted to the control box; and the emergency lighting module being oriented towards the handle.

13. The powered handle bar apparatus for walking assistance as claimed in claim 1, wherein the power source being a primary power supply and a secondary power supply.

14. The powered handle bar apparatus for walking assistance as claimed in claim 13 comprises:

the primary power supply comprises an alternating current (AC) port and a rectifier;

the AC port being mounted to the control box;

the rectifier being mounted within the control box; and the AC port being electrically connected to the rectifier.

15. The powered handle bar apparatus for walking assistance as claimed in claim 13 comprises:

the secondary power supply comprises a battery and a charger;

the battery and the charger being mounted within the control box; and the battery being electrically connected to the charger.

* * * * *